(12) United States Patent
Kanemori et al.

(10) Patent No.: US 9,914,442 B2
(45) Date of Patent: Mar. 13, 2018

(54) STOPPING ENERGY BASED SELECTION LOGIC FOR TAXI BRAKE RELEASE

(71) Applicant: THE BOEING COMPANY, Chicago, IL (US)

(72) Inventors: Scott Brandon Kanemori, Seattle, WA (US); David T. Yamamoto, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/972,645

(22) Filed: Aug. 21, 2013

(65) Prior Publication Data

US 2015/0057902 A1 Feb. 26, 2015

(51) Int. Cl.
*B60T 8/17* (2006.01)
*B60T 13/66* (2006.01)

(52) U.S. Cl.
CPC .......... *B60T 13/662* (2013.01); *B60T 8/1703* (2013.01)

(58) Field of Classification Search
CPC .................................. B60T 7/00; B60T 8/1703
See application file for complete search history.

(56) References Cited

U.S. PATENT DOCUMENTS

| 4,078,845 A * | 3/1978 | Amberg et al. ............... 303/164 |
| 4,195,472 A * | 4/1980 | Robinson ............... B63H 23/08 192/218 |
| 4,923,056 A | 5/1990 | Nedelk |
| 5,136,508 A * | 8/1992 | Bannon et al. ............... 701/70 |
| 5,431,241 A * | 7/1995 | May .................. B60K 28/16 180/197 |
| 6,398,162 B1 * | 6/2002 | Stimson et al. ............. 244/111 |

(Continued)

FOREIGN PATENT DOCUMENTS

| CN | 101356085 | 1/2009 |
| CN | 102300755 | 12/2011 |

(Continued)

OTHER PUBLICATIONS

"Anti-lock Braking System", Wikipedia, downloaded on Aug. 20, 2013, from http://en.wikipedia.org/wiki/Anti-lock_braking_system.

(Continued)

*Primary Examiner* — Todd Melton
*Assistant Examiner* — Jason R Roberson
(74) *Attorney, Agent, or Firm* — Haynes and Boone, LLP

(57) ABSTRACT

The present disclosure provides a system, method, and apparatus for distributing energy amongst at least one forward brake and at least one aft brake for a vehicle. The method involves determining, with at least one processor, an energy for at least one first brake and an energy for at least one second brake. Further, the method involves comparing, with at least one processor, the energy for at least one first brake with the energy for at least one second brake. Also, releasing at least one first brake, when at least one processor determines the energy of at least one first brake is greater than the energy for at least one second brake. Further, releasing at least one second brake, when at least one processor determines the energy of at least one second brake is greater than the energy for at least one first brake.

20 Claims, 5 Drawing Sheets

(56) References Cited

U.S. PATENT DOCUMENTS

| | | | |
|---|---|---|---|
| 6,604,708 B1* | 8/2003 | DeVlieg | B60T 8/00 188/264 R |
| 2004/0212251 A1* | 10/2004 | Kinder | B60T 8/00 303/191 |
| 2006/0131950 A1* | 6/2006 | Larson | B60T 8/00 303/7 |
| 2012/0261980 A1* | 10/2012 | Hurst et al. | 303/9.75 |

FOREIGN PATENT DOCUMENTS

| | | |
|---|---|---|
| EP | 0329373 A1 | 8/1989 |
| EP | 0443213 B1 | 3/1996 |
| EP | 0776289 | 12/1999 |
| JP | 2011178395 A1 | 9/2011 |

OTHER PUBLICATIONS

Extended European Search Report, Application No. 14180411.2-1756 / 2848479, dated Feb. 9, 2016.

* cited by examiner

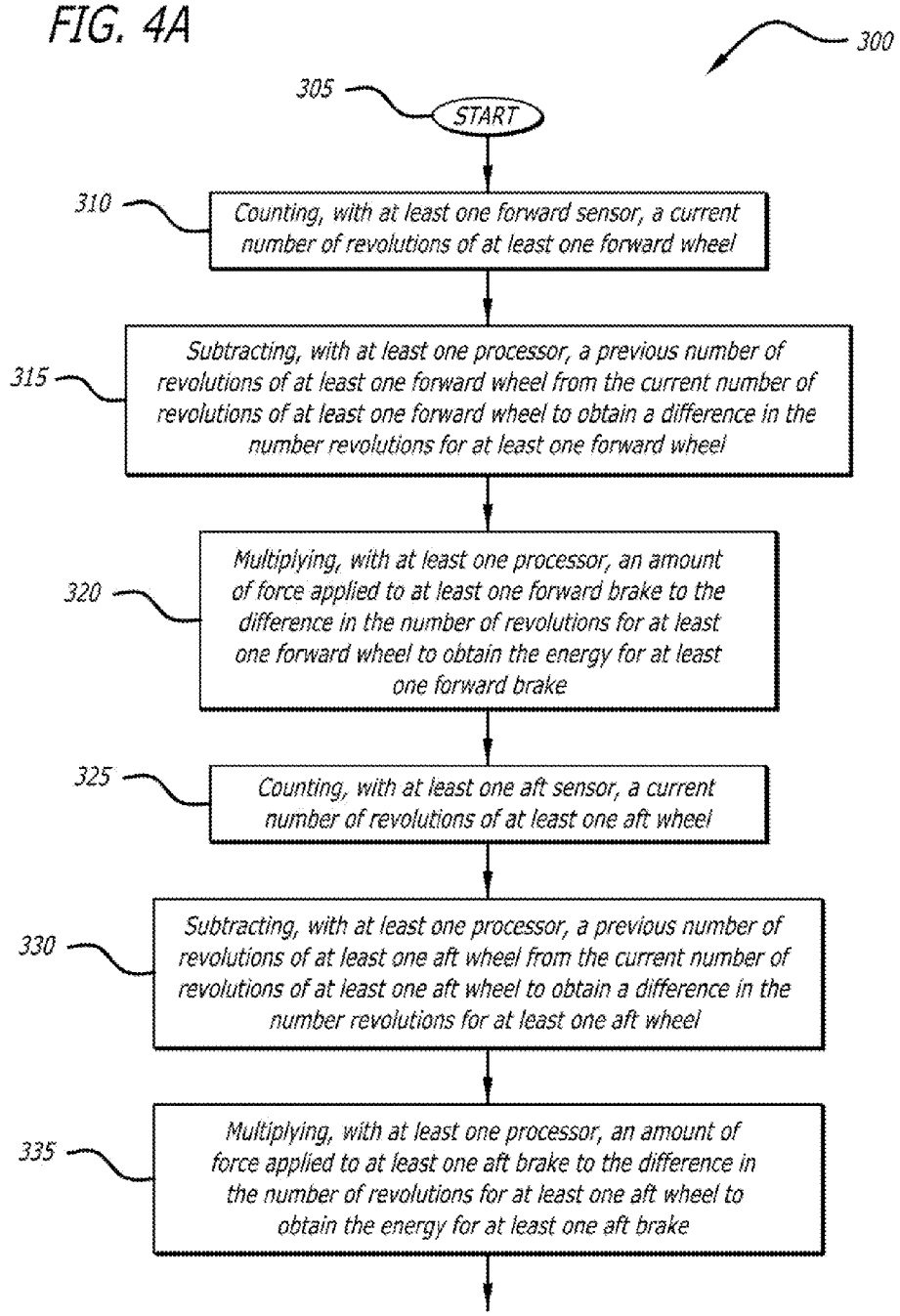

STOPPING ENERGY BASED SELECTION LOGIC FOR TAXI BRAKE RELEASE

BACKGROUND

The present disclosure relates to taxi brake release. In particular, it relates to stopping energy based selection logic for taxi brake release.

Currently, a conventional brake selection method employs a simply alternating scheme where consecutive brake pedal applications switch back and forth the releasing of the forward and the aft brakes in vehicles, such as in aircraft. This method simply assumes that alternating the forward and the aft brakes with every application will evenly distribute the brake energy (i.e. the stopping energy). This method does not account for variations in brake pedal application by the pilot.

On a Boeing 777 aircraft, for example, this conventional alternating method performs adequately because the aircraft has a six-wheel truck and, as such, the method releases two wheels per truck, thereby distributing the brake energy over two-thirds (⅔) of the wheels. However, on a Boeing 787 aircraft, for example, this method does not perform adequately because the aircraft has a four-wheel truck and, thus, the method releases two wheels per truck, thereby distributing the brake energy over only one-half (½) of the wheels. Therefore, there is a need for a solution that provides selection logic for taxi brake release based on stopping energy.

SUMMARY

The present disclosure relates to a method, system, and apparatus for stopping energy based selection logic for taxi brake release. In one or more embodiments, a method is disclosed for distributing energy amongst at least one first brake and at least one second brake for a vehicle. The disclosed method involves determining, with at least one processor, an energy for at least one first brake and an energy for at least one second brake. Further, the method involves comparing, with at least one processor, the energy for at least one first brake with the energy for at least one second brake. Also, releasing at least one first brake, when at least one processor determines the energy of at least one first brake is greater than the energy for at least one second brake. Further, releasing at least one second brake, when at least one processor determines the energy of at least one second brake is greater than the energy for at least one first brake.

In at least one embodiment, at least one first brake is at least one forward brake, and at least one second brake is at least one aft brake. In some embodiments, the method further comprises counting, with at least one first sensor, a current number of revolutions of at least one first wheel. In one or more embodiments, the method further comprises counting, with at least one second sensor, a current number of revolutions of at least one second wheel.

In one or more embodiments, the method further involves subtracting, with at least one processor, a previous number of revolutions of at least one first wheel from a current number of revolutions of at least one first wheel to obtain a difference in the number revolutions for at least one first wheel. In addition, the method further involves multiplying, with at least one processor, an amount of force applied to at least one first brake to the difference in the number of revolutions for at least one first wheel to obtain the energy for at least one first brake.

In at least one embodiment, the method further involves subtracting, with at least one processor, a previous number of revolutions of at least one second wheel from a current number of revolutions of at least one second wheel to obtain a difference in the number revolutions for at least one second wheel. Also, the method further involves multiplying, with at least one processor, an amount of force applied to at least one second brake to the difference in the number of revolutions for at least one second wheel to obtain the energy for at least one second brake.

In at least one embodiment, a method for distributing energy amongst at least one forward brake and at least one aft brake for a vehicle involves subtracting, with at least one processor, an energy for at least one aft brake from an energy for at least one forward brake to obtain a difference in brake energy. Also, the method involves determining, with at least one processor, whether the difference in brake energy is greater than zero. In addition, the method involves releasing at least one forward brake, when the difference in brake energy is greater than zero. Further, the method involves releasing at least one aft brake, when the difference in brake energy is less than or equal to zero.

In one or more embodiments, the disclosed method further involves counting, with at least one forward sensor, a current number of revolutions of at least one forward wheel. In some embodiments, the method further involves counting, with at least one aft sensor, a current number of revolutions of at least one aft wheel.

In at least one embodiment, the method further involves subtracting, with at least one processor, a previous number of revolutions of at least one forward wheel from a current number of revolutions of at least one forward wheel to obtain a difference in the number revolutions for at least one forward wheel. Also, the method involves multiplying, with at least one processor, an amount of force applied to at least one forward brake to the difference in the number of revolutions for at least one forward wheel to obtain the energy for at least one forward brake.

In one or more embodiments, the method further involves subtracting, with at least one processor, a previous number of revolutions of at least one aft wheel from a current number of revolutions of at least one aft wheel to obtain a difference in the number revolutions for at least one aft wheel. In addition, the method involves multiplying, with at least one processor, an amount of force applied to at least one aft brake to the difference in the number of revolutions for at least one aft wheel to obtain the energy for at least one aft brake.

In at least one embodiment, the method further involves, prior to the determining of whether the difference in brake energy is greater than zero, adding, with at least one processor, a remaining amount of brake energy to the difference in brake energy. In some embodiments, the method further involves multiplying, with at least one processor, a previous difference in brake energy with a brake cooling factor to obtain the remaining amount of brake energy. In one or more embodiments, the brake cooling factor is related to a material of at least one forward brake, a material of at least one aft brake, an ambient temperature affect, a loading of the vehicle (e.g., an aircraft), road (e.g., runway) conditions, and/or weather conditions.

In one or more embodiments, a system is disclosed for distributing energy amongst at least one forward brake and at least one aft brake for a vehicle. The disclosed system includes at least one forward brake and at least one aft brake. Also, the system includes at least one processor configured to subtract an energy for at least one aft brake from an energy for at least one forward brake to obtain a difference in brake energy, and to determine whether the difference in brake energy is greater than zero. In one or more embodiments, when the difference in brake energy is greater than zero, at least one forward brake is released. In at least one embodiment, when the difference in brake energy is less than or equal to zero, at least one aft brake is released.

In at least one embodiment, the vehicle is an airborne vehicle, a terrestrial vehicle, or a marine vehicle. In some embodiments, the airborne vehicle is an aircraft. For these embodiments, the forward and aft brakes are associated with at least one landing gear truck containing at least one wheel. In one or more embodiments, the terrestrial vehicle is a train, a truck, a trailer, an automobile, a motorcycle, or a tank. In some embodiments, the marine vehicle is a boat or a ship. For these embodiments, the forward and aft brakes are associated with at least one propeller of the marine vehicle.

In one or more embodiments, the system further includes at least one forward wheel, and at least one forward sensor to count a current number of revolutions of at least one forward wheel. In some embodiments, the system further includes at least one aft wheel, and at least one aft sensor to count a current number of revolutions of at least one aft wheel.

In at least one embodiment, at least one processor is further configured to subtract a previous number of revolutions of at least one forward wheel from a current number of revolutions of at least one forward wheel to obtain a difference in the number revolutions for at least one forward wheel, and to multiply an amount of force applied to at least one forward brake to the difference in the number of revolutions for at least one forward wheel to obtain the energy for at least one forward brake.

In one or more embodiments, at least one processor is further configured to subtract a previous number of revolutions of at least one aft wheel from a current number of revolutions of at least one aft wheel to obtain a difference in the number revolutions for at least one aft wheel, and to multiply an amount of force applied to at least one aft brake to the difference in the number of revolutions for at least one aft wheel to obtain the energy for at least one aft brake.

In at least one embodiment, at least one processor is further configured to add a remaining amount of brake energy to the difference in brake energy. In some embodiments, at least one processor is further configured to multiply a previous difference in brake energy with a brake cooling factor to obtain the remaining amount of brake energy. In one or more embodiments, the brake cooling factor is a value equal to or greater than zero (0) and less than or equal to one (1).

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

Figure 4B:
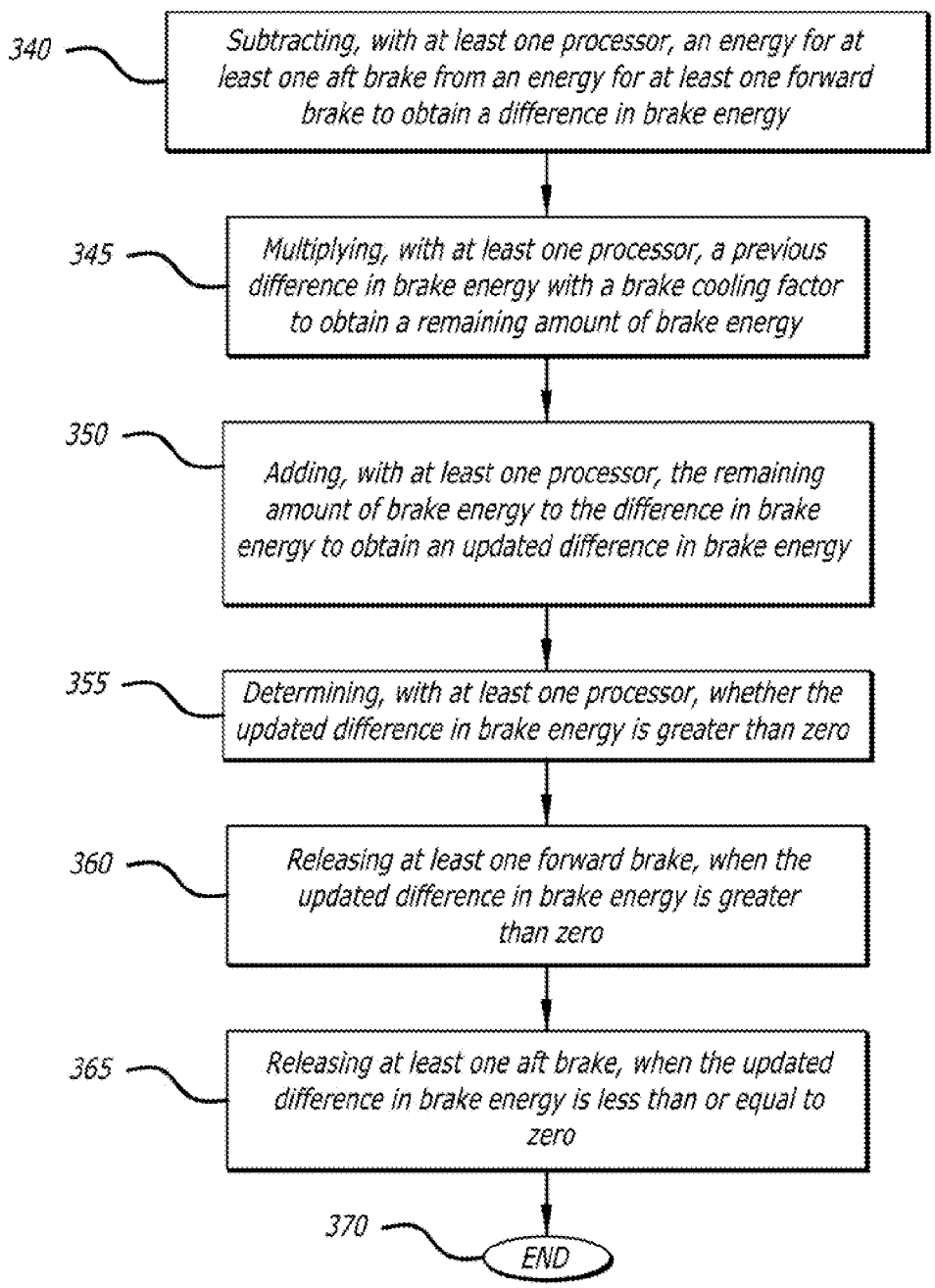

FIGS. 4A and 4B contain a flow diagram showing the disclosed method for distributing energy amongst at least one forward brake and at least one aft brake for a vehicle, in accordance with at least one embodiment of the present disclosure.

DESCRIPTION

The methods and apparatus disclosed herein provide an operative system for stopping energy based selection logic for taxi brake release. In particular, the disclosed logic is to be used for the taxi brake release function to determine which brake (i.e. the forward brake or the aft brake) to select based on the amount of brake energy absorbed. This logic uses wheel revolution counts and brake commands during a braking cycle to determine which brake has absorbed more energy. The brake that has absorbed more energy would be the hottest brake and, as such, that brake is released while taxiing.

During operation of the system, the system will determine the distance traveled by counting the wheel rotations. The distance will be multiplied by the brake force command (i.e. the amount of force applied to the brake) to determine the energy being absorbed by the brakes. The difference in brake energy for the current cycle will be determined by subtracting the aft brake energy value from the forward brake energy value. The overall value will be calculated by then taking the brake energy difference calculation from the previous cycle, multiplying it to a cooling factor (e.g., a value between zero (0), for maximum (instant) cooling, and one (1), for no cooling), and adding it to the current energy difference. If the value is a positive value, the forward brake has more energy and, thus, will be released during taxi braking. Conversely, if the value is a negative value, the aft brake has more energy and, as such, will be released during taxi braking. This releasing of the brake with more absorbed energy will reduce the likelihood that there will be a large difference in brake temperatures leading to brake overheating. An advantage of this system is that it accounts for variations introduced by a pilot who applies uneven brake commands during pedal application.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
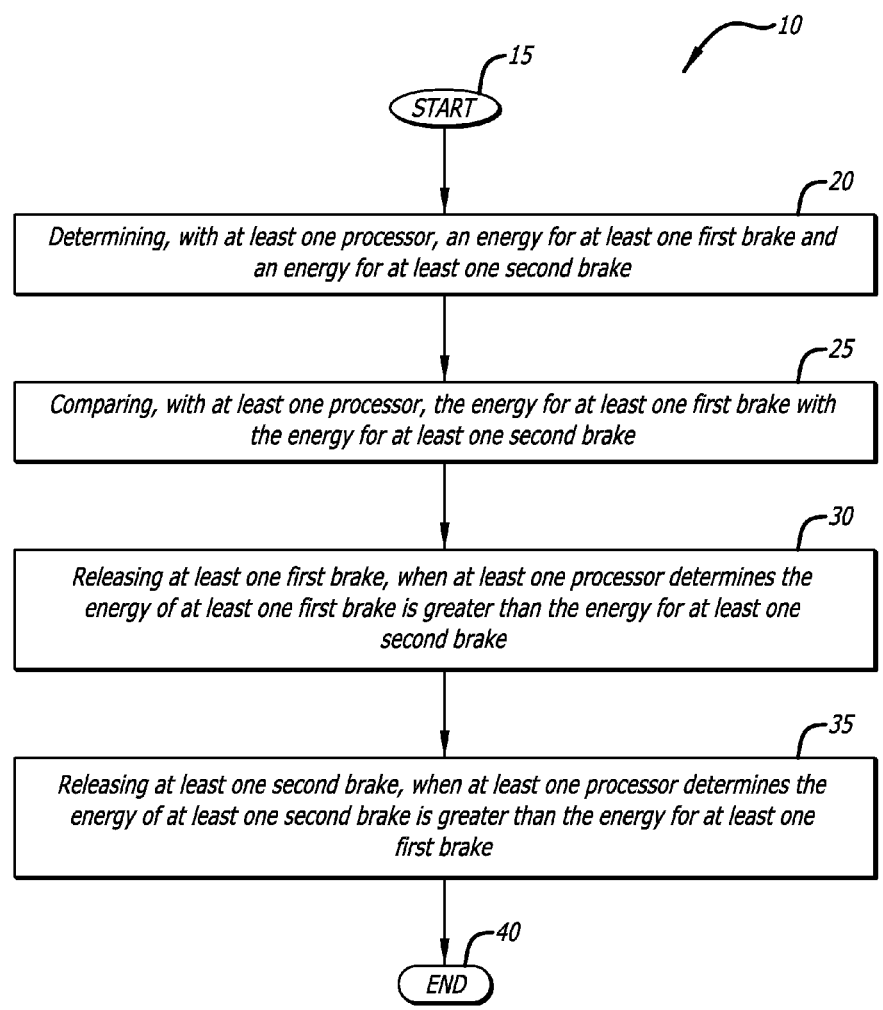
FIG. 1 is a flow diagram showing the disclosed method for distributing energy amongst at least one first brake and at least one second brake for a vehicle, in accordance with at least one embodiment of the present disclosure.

FIG. 1 is a flow diagram showing the disclosed method 10 for distributing energy amongst at least one first brake and at least one second brake for a vehicle, in accordance with at least one embodiment of the present disclosure. At the start 15 of the method 10, at least one processor determines an energy for at least one first brake and an energy for at least one second brake 20. Then, at least one processor compares the energy for at least one first brake with the energy for at least one second brake 25. When at least one processor determines that the energy of at least one first brake is greater than the energy for at least one second brake, at least one first brake is released 30. When at least one processor determines that the energy of at least one second brake is greater than the energy for at least one first brake, at least one second brake is released 35. Then, the method 10 ends 40. It should be noted that in various embodiments, at least one first brake may be at least one aft brake and/or at least one forward brake. In addition, at least one second brake may be at least one forward brake and/or at least one aft brake.

Figure 2:
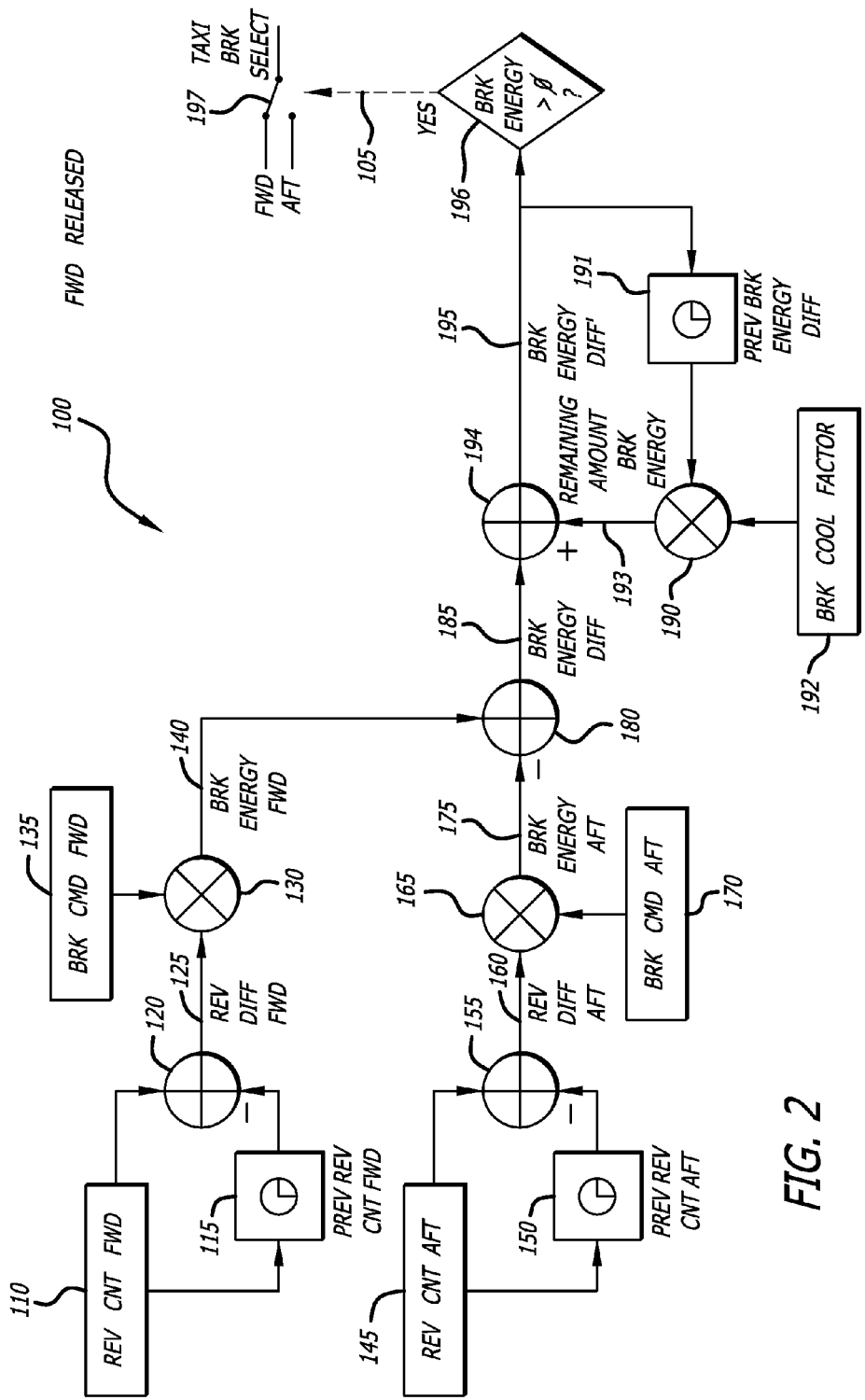
FIG. 2 is a schematic diagram illustrating the disclosed logic for distributing energy amongst at least one forward brake and at least one aft brake for a vehicle, where the difference in brake energy is greater than zero, in accordance with at least one embodiment of the present disclosure.

FIG. 2 is a schematic diagram 100 illustrating the disclosed logic for distributing energy amongst at least one forward brake and at least one aft brake for a vehicle, where the difference in brake energy is greater than zero 105, in accordance with at least one embodiment of the present disclosure. For this figure, data for the forward braking system is being compared to data for the aft braking system. However, it should be noted that in alternative embodiments, data for some of the brakes (which may include some of the forward brakes and/or some of the aft brakes) may be compared to data for the remaining brakes (which may include some of the forward brakes and/or some of the aft brakes).

For this logic, at least one forward sensor counts a current number of revolutions of at least one forward wheel (i.e. revolution count forward (rev CNT FWD)) 110. At least one processor subtracts 120 a previous number of revolutions of at least one forward wheel (i.e. previous revolution count forward (Prev rev CNT FWD)) 115 from the current number of revolutions of at least one forward wheel (i.e. rev CNT FWD) 110 to obtain a difference in the number of revolutions for at least one forward wheel (i.e. revolution difference forward (rev DIFF FWD)) 125. It should be noted that a revolution count of the wheel(s) is performed every clock cycle and, as such, a "previous revolution count" is the revolution count of the wheel(s) from the previous clock cycle. The intent is to keep track of how far the vehicle (e.g., airplane) has travelled since the last clock cycle. Since the disclosed system counts wheel revolution, this is the unit of measurement the system uses.

Then, at least one processor multiplies 130 an amount of force applied to at least one forward brake (i.e. brake command forward (BRK CMD FWD)) 135 to the difference in the number of revolutions for at least one forward wheel (i.e. rev DIFF FWD) 125 to obtain the energy for at least one forward brake (i.e. brake energy forward (BRK energy FWD)) 140. It should be noted that the force level may vary over time. The disclosed system will used the most recent force level value for the brake energy calculation.

Similarly, at least one aft sensor counts a current number of revolutions of at least one aft wheel (i.e. revolution count aft (rev CNT AFT)) 145. At least one processor subtracts 155 a previous number of revolutions of at least one aft wheel (i.e. previous revolution count aft (Prev rev CNT AFT)) 150 from the current number of revolutions of at least one aft wheel (i.e. rev CNT AFT) 145 to obtain a difference in the number of revolutions for at least one aft wheel (i.e. revolution difference aft (rev DIFF AFT)) 160. Then, at least one processor multiplies 165 an amount of force applied to at least one aft brake (i.e. brake command aft (BRK CMD AFT)) 170 to the difference in the number of revolutions for at least one aft wheel (i.e. rev DIFF AFT) 160 to obtain the energy for at least one aft brake (i.e. brake energy aft (BRK energy AFT)) 175.

It should be noted that for the disclosed system, the historical braking data that is retained are the forward and aft revolution counts from the previous clock cycles as well as the forward and aft brake energy calculation from the previous clock cycle.

At least one processor then subtracts an energy for at least one aft brake (i.e. BRK energy AFT) 175 from an energy for at least one forward brake (i.e. BRK energy FWD) 140 to obtain a difference in brake energy (i.e. brake energy difference (BRK energy DIFF)) 185.

Also, at least one processor multiplies 190 a previous difference in brake energy (i.e. previous brake energy difference (Prev BRK energy DIFF)) 191 with a brake cooling factor (i.e. brake cool factor (BRK Cool Factor)) 192 to obtain a remaining amount of brake energy (i.e. remaining amount brake energy (remaining amount BRK energy)) 193. For example, the cooling factor is a value between zero (0), for maximum cooling, and one (1), for no cooling. Various different types of factors and/or characteristic may be used to determine the value to use for the cooling factor including, but not limited to, the material of the brakes, the ambient temperature affect, the loading of the vehicle (e.g., the aircraft), the road (e.g., runway) conditions, and the weather conditions.

Then, at least one processor adds 194 the remaining amount of brake energy (i.e. remaining amount BRK energy) 193 to the difference in brake energy (i.e. BRK energy DIFF) 185 to obtain an updated difference in brake energy (i.e. brake energy difference prime (BRK energy DIFF')) 195. Then, at least one processor determines whether the updated difference in brake energy (i.e. BRK energy DIFF') 195 is greater than zero (0) 196. For this example, at least one processor has determined that the updated difference in brake energy (i.e. BRK energy DIFF') 195 is greater than zero 105. In response, a switch 197 is switched to a position such that at least one forward brake is released during the braking application.

Figure 3:
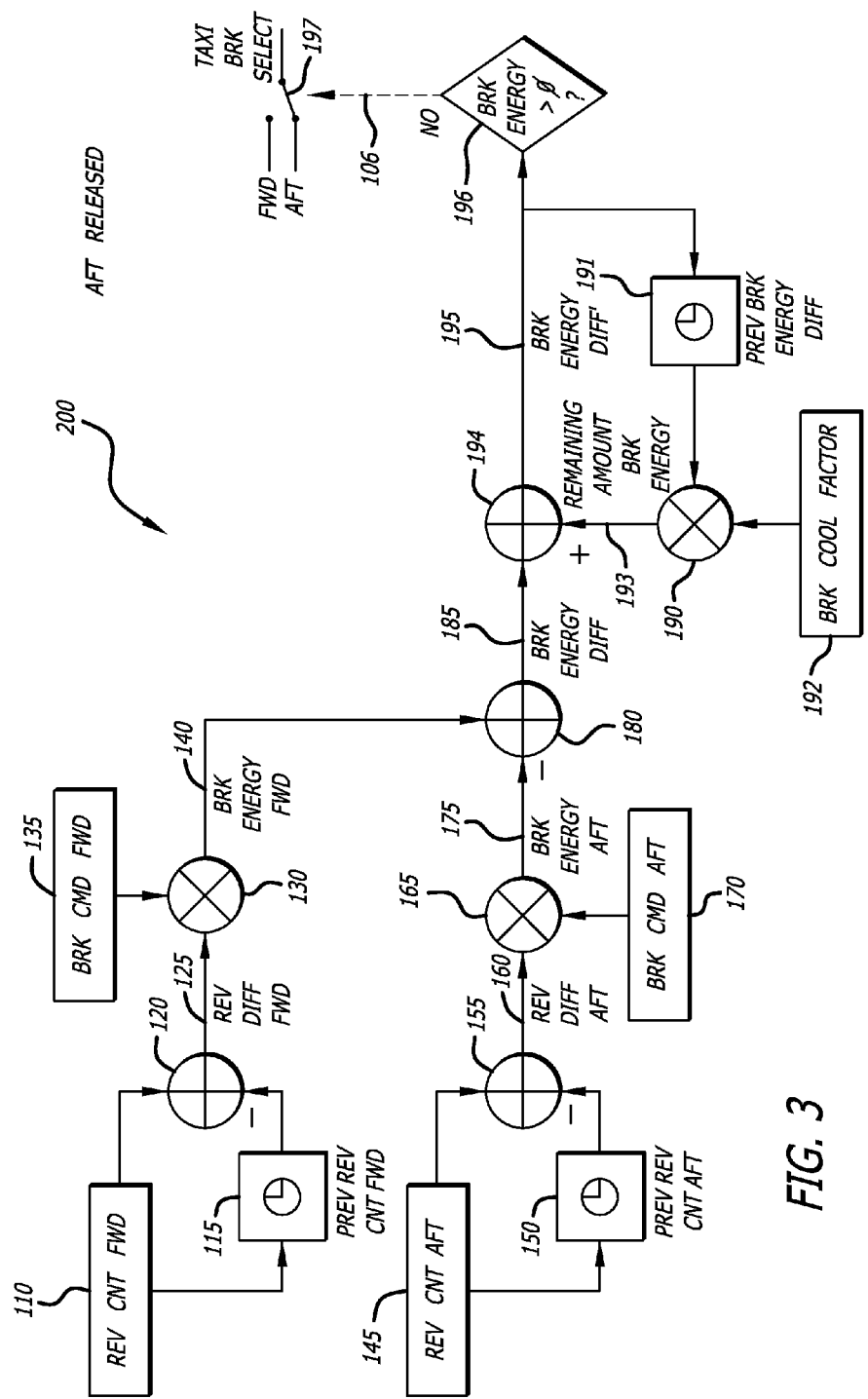
FIG. 3 is a schematic diagram depicting the disclosed logic for distributing energy amongst at least one forward brake and at least one aft brake for a vehicle, where the difference in brake energy is less than or equal to zero, in accordance with at least one embodiment of the present disclosure.

FIG. 3 is a schematic diagram 200 depicting the disclosed logic for distributing energy amongst at least one forward brake and at least one aft brake for a vehicle, where the difference in brake energy is less than or equal to zero 106, in accordance with at least one embodiment of the present disclosure. It should be noted that the logic depicted in FIG. 3 is the same as the logic shown in FIG. 2. FIG. 3 is simply presented to show how the switch 197 changes its position when the updated difference in brake energy (i.e. BRK energy DIFF') 195 is not greater than zero 106. As such, for this example, at least one processor has determined that the updated difference in brake energy (i.e. BRK energy DIFF') 195 is not greater than zero 106. In response, the switch 197 is switched to a position such that at least one aft brake is released during the braking application.

FIGS. 4A and 4B contain a flow diagram 300 showing the disclosed method for distributing energy amongst at least one forward brake and at least one aft brake for a vehicle, in accordance with at least one embodiment of the present disclosure. At the start 305 of the method 300, at least one forward sensor counts a current number of revolutions of at least one forward wheel 310. Then, at least one processor subtracts a previous number of revolutions of at least one forward wheel from the current number of revolutions of at least one forward wheel to obtain a difference in the number revolutions for at least one forward wheel 315. At least one processor then multiples an amount of force applied to at least one forward brake to the difference in the number of revolutions for at least one forward wheel to obtain the energy for at least one forward brake 320.

In addition, at least one aft sensor counts a current number of revolutions of at least one aft wheel 325. At least one processor then subtracts a previous number of revolutions of at least one aft wheel from the current number of revolutions of at least one aft wheel to obtain a difference in the number revolutions for at least one aft wheel 330. Then, at least one processor multiplies an amount of force applied to at least one aft brake to the difference in the number of revolutions for at least one aft wheel to obtain the energy for at least one aft brake 335.

Additionally, at least one processor subtracts an energy for at least one aft brake from an energy for at least one forward brake to obtain a difference in brake energy 340. Then, at least one processor multiples a previous difference in brake energy with a brake cooling factor to obtain a remaining amount of brake energy 345. At least one processor then adds the remaining amount of brake energy to the difference in brake energy 350 to obtain an updated difference in brake energy.

In addition, at least one processor determines whether the updated difference in brake energy is greater than zero 355. When the updated difference in brake energy is greater than zero, at least one forward brake is released 360. Conversely, when the updated difference in brake energy is less than or equal to zero, at least one aft brake is released 365. Then, the method 300 ends 370.

It should be noted that the vehicle employed by the disclosed system, method, and apparatus for stopping energy based selection logic for taxi brake release may be an airborne vehicle, a terrestrial vehicle, or a marine vehicle. In some embodiments, the airborne vehicle may be an aircraft. For these embodiments, the forward and aft brakes are associated with at least one landing gear truck containing at least one wheel. In one or more embodiments, the terrestrial vehicle may be a train, a truck, a trailer, an automobile, a motorcycle, or a tank. In some embodiments, the marine vehicle may be a boat or a ship. For these embodiments, the forward and aft brakes are associated with at least one propeller of the marine vehicle.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for distributing energy amongst at least one first brake and at least one second brake for a vehicle, the method comprising:
   subtracting, with at least one processor, a previous number of revolutions of at least one first wheel, which were counted during a previous clock cycle, from a current number of revolutions of the at least one first wheel, which were counted during a current clock cycle, to obtain a difference in the number revolutions for the at least one first wheel;
   multiplying, with the at least one processor, force applied to the at least one first brake to the difference in the number of revolutions for the at least one first wheel to obtain brake energy absorbed by the at least one first brake;
   subtracting, with the at least one processor, a previous number of revolutions of at least one second wheel, which were counted during the previous clock cycle, from a current number of revolutions of the at least one second wheel, which were counted during the current clock cycle, to obtain a difference in the number revolutions for the at least one second wheel;
   multiplying, with the at least one processor, force applied to the at least one second brake to the difference in the number of revolutions for the at least one second wheel to obtain brake energy absorbed by the at least one second brake;
   comparing, with the at least one processor, the brake energy absorbed by the at least one first brake with the brake energy absorbed by the at least one second brake;
   releasing, by a switch, the at least one first brake, when the at least one processor determines the brake energy absorbed by the at least one first brake is greater than the brake energy absorbed by the at least one second brake to allow the at least one first brake to cool; and
   releasing, by the switch, the at least one second brake, when the at least one processor determines the brake energy absorbed by the at least one second brake is greater than the brake energy absorbed by the at least one first brake to allow the at least one second brake to cool.

2. The method of claim 1, wherein the at least one first brake is at least one forward brake, and wherein the at least one second brake is at least one aft brake.

3. The method of claim 1, wherein the method further comprises counting, with at least one first sensor, during the current clock cycle, the current number of revolutions of the at least one first wheel; and
   counting, with at least one second sensor, during the current clock cycle, the current number of revolutions of the at least one second wheel.

4. A method for distributing energy amongst at least one forward brake and at least one aft brake for a vehicle, the method comprising:
   subtracting, with at least one processor, a previous number of revolutions of at least one forward wheel, which were counted during a previous clock cycle, from a current number of revolutions of the at least one forward wheel, which were counted during a current clock cycle, to obtain a difference in the number revolutions for the at least one forward wheel;
   multiplying, with the at least one processor, force applied to the at least one forward brake to the difference in the number of revolutions for the at least one forward wheel to obtain brake energy absorbed by the at least one forward brake;
   subtracting, with the at least one processor, a previous number of revolutions of at least one aft wheel, which were counted during the previous clock cycle, from a current number of revolutions of the at least one aft wheel, which were counted during the current clock cycle, to obtain a difference in the number revolutions for the at least one aft wheel;
   multiplying, with the at least one processor, force applied to the at least one aft brake to the difference in the number of revolutions for the at least one aft wheel to obtain brake energy absorbed by the at least one aft brake;
   subtracting, with at least one processor, the brake energy absorbed by the at least one aft brake from the brake energy absorbed by the at least one forward brake to obtain a difference in brake energy;
   determining, with the at least one processor, whether the difference in brake energy is greater than zero;
   releasing, by a switch, the at least one forward brake, when the difference in brake energy is greater than zero to allow the at least one forward brake to cool; and releasing, by the switch, the at least one aft brake, when the difference in brake energy is one of less than zero and equal to zero to allow the at least one aft brake to cool.

5. The method of claim 4, wherein the method further comprises counting, with at least one forward sensor, during the current clock cycle, the current number of revolutions of the at least one forward wheel; and counting, with at least one aft sensor, during the current clock cycle, the current number of revolutions of the at least one aft wheel.

6. The method of claim 4, wherein the method further comprises, prior to the determining of whether the difference in brake energy is greater than zero, adding, with the at least one processor, a remaining amount of brake energy to the difference in brake energy.

7. The method of claim 6, wherein the method further comprises multiplying, with the at least one processor, a previous difference in brake energy with a brake cooling factor to obtain the remaining amount of brake energy.

8. The method of claim 7, wherein the brake cooling factor is related to at least one of a material of the at least one forward brake, a material of the at least one aft brake, an ambient temperature affect, a loading of the vehicle, road conditions, and weather conditions.

9. A system for distributing energy amongst at least one forward brake and at least one aft brake for a vehicle, the system comprising:

the at least one forward brake;

the at least one aft brake; and at least one processor configured (1) to subtract a previous number of revolutions of at least one forward wheel, which were counted during a previous clock cycle, from a current number of revolutions of the at least one forward wheel, which were counted during a current clock cycle, to obtain a difference in the number revolutions for the at least one forward wheel, (3) to multiply force applied to the at least one forward brake to the difference in the number of revolutions for the at least one forward wheel to obtain brake energy absorbed by the at least one forward brake, (4) to subtract a previous number of revolutions of at least one aft wheel, which were counted during the previous clock cycle, from a current number of revolutions of the at least one aft wheel, which were counted during the current clock cycle, to obtain a difference in the number revolutions for the at least one aft wheel, (5) to multiply force applied to the at least one aft brake to the difference in the number of revolutions for the at least one aft wheel to obtain brake energy absorbed by the at least one aft brake, (6) to subtract the brake energy absorbed by the at least one aft brake from the brake energy absorbed by the at least one forward brake to obtain a difference in brake energy, and (7) to determine whether the difference in brake energy is greater than zero, wherein when the difference in brake energy is greater than zero, at least one forward brake is released, by a switch, to allow the at least one forward brake to cool, and wherein when the difference in brake energy is one of less than zero and equal to zero, at least one aft brake is released, by the switch, to allow the at least one aft brake to cool.

10. The system of claim 9, wherein the vehicle is an airborne vehicle.

11. The system of claim 10, wherein the airborne vehicle is an aircraft.

12. The system of claim 9, wherein the vehicle is a terrestrial vehicle, and wherein the terrestrial vehicle is one of a train, a truck, a trailer, an automobile, a motorcycle, and a tank.

13. The system of claim 9, wherein the vehicle is a marine vehicle, and wherein the marine vehicle is one of a boat and a ship.

14. The system of claim 9, wherein the system further comprises:

at least one forward sensor to count, during a current clock cycle, a current number of revolutions of the at least one forward wheel; and at least one aft sensor to count, during the current clock cycle, a current number of revolutions of the at least one aft wheel.

15. The method of claim 1, wherein the method further comprises, prior to the determining of whether the difference in brake energy is greater than zero, adding, with the at least one processor, a remaining amount of brake energy to the difference in brake energy.

16. The method of claim 15, wherein the method further comprises multiplying, with the at least one processor, a previous difference in brake energy with a brake cooling factor to obtain the remaining amount of brake energy.

17. The method of claim 16, wherein the brake cooling factor is related to at least one of a material of the at least one first brake, a material of the at least one second brake, an ambient temperature affect, a loading of the vehicle, road conditions, and weather conditions.

18. The system of claim 9, wherein the at least one processor is further configured to, prior to the determining of whether the difference in brake energy is greater than zero, to add a remaining amount of brake energy to the difference in brake energy.

19. The system of claim 18, wherein the at least one processor is further configured to multiply a previous difference in brake energy with a brake cooling factor to obtain the remaining amount of brake energy.

20. The system of claim 16, wherein the brake cooling factor is related to at least one of a material of the at least one forward brake, a material of the at least one aft brake, an ambient temperature affect, a loading of the vehicle, road conditions, and weather conditions.

* * * * *